(12) United States Patent
Ovshinsky et al.

(10) Patent No.: US 7,097,933 B2
(45) Date of Patent: Aug. 29, 2006

(54) CATALYST FOR FUEL CELL OXYGEN ELECTRODES

(75) Inventors: Stanford R. Ovshinsky, Bloomfield Hills, MI (US); Cristian Fierro, Northville, MI (US); Benjamin Reichman, West Bloomfield, MI (US); William Mays, Commerce, MI (US); James Strebe, Clawson, MI (US); Michael A. Fetcenko, Rochester, MI (US); Avram Zallen, West Bloomfield, MI (US); Tim Hicks, Redford, MI (US)

(73) Assignee: Ovonic Battery Company, Inc., Rochester Hills, MI (US)

( * ) Notice: Subject to any disclaimer, the term of this patent is extended or adjusted under 35 U.S.C. 154(b) by 46 days.

(21) Appl. No.: 10/457,624

(22) Filed: Jun. 9, 2003

(65) Prior Publication Data

US 2004/0247988 A1 Dec. 9, 2004

(51) Int. Cl.
*H01M 4/86* (2006.01)

(52) U.S. Cl. .................. 429/44; 429/40; 502/300; 502/324; 502/100; 502/102; 502/152; 502/153; 502/154; 502/527.13; 502/527.15

(58) Field of Classification Search ........ 502/300–355, 502/152–154, 527.13, 527.15, 100, 102; 429/44, 40
See application file for complete search history.

(56) References Cited

U.S. PATENT DOCUMENTS

| 3,926,844 | A |   | 12/1975 | Benczur-Urmossy |
|---|---|---|---|---|
| 4,113,658 | A |   | 9/1978 | Geus |
| 4,544,473 | A |   | 10/1985 | Ovshinsky et al. |
| 4,670,360 | A |   | 6/1987 | Haberman et al. |
| 4,686,030 | A |   | 8/1987 | Ward |
| 4,980,037 | A |   | 12/1990 | Hossain et al. |
| 5,300,371 | A | * | 4/1994 | Tomantschger et al. ...... 429/60 |
| 5,506,077 | A | * | 4/1996 | Koksbang ................... 429/224 |
| 5,536,591 | A |   | 7/1996 | Fetcenko et al. |
| 6,069,107 | A | * | 5/2000 | Kuznetsov et al. ......... 502/101 |
| 6,071,850 | A | * | 6/2000 | Friedman et al. .......... 502/439 |
| 6,368,751 | B1 |   | 4/2002 | Yao et al. |
| 6,660,680 | B1 | * | 12/2003 | Hampden-Smith et al. . 502/180 |

FOREIGN PATENT DOCUMENTS

WO   WO 01/93999 A2 * 12/2001

OTHER PUBLICATIONS

Yarris, Lynn. Legos for the Nano-Age: Nanocrystals: The Shapes of Things to Come. Berkeley Lab Research Review. Fall 2001. Berkeley Lab Public Information Department.*
http://en.wikipedia.org/wiki/crystallite.*

* cited by examiner

*Primary Examiner*—Laura Weiner
(74) *Attorney, Agent, or Firm*—Kevin L. Bray; Marvin S. Siskind

(57) ABSTRACT

A catalyst having catalytically active material supported on a carrier matrix. The catalytically active material may be a mixed-valence, nanoclustered oxide(s), an organometallic material or a combination thereof. The supported catalytic material is particularly useful for catalyzing oxygen reduction in a fuel cell, such as an alkaline fuel cell.

9 Claims, 9 Drawing Sheets

Carbon

Mixed Valence Co Catalyst applied by slow deposition

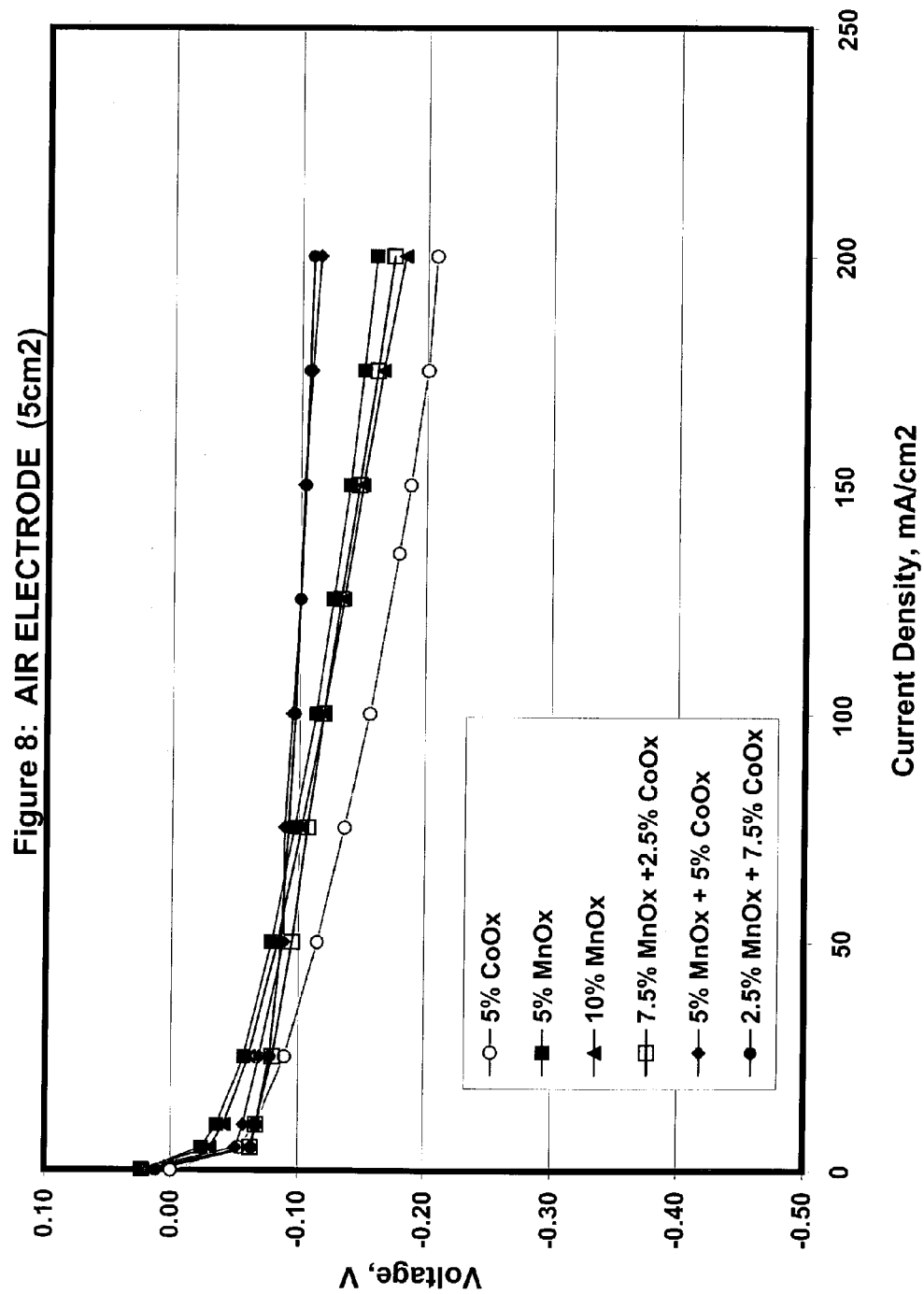

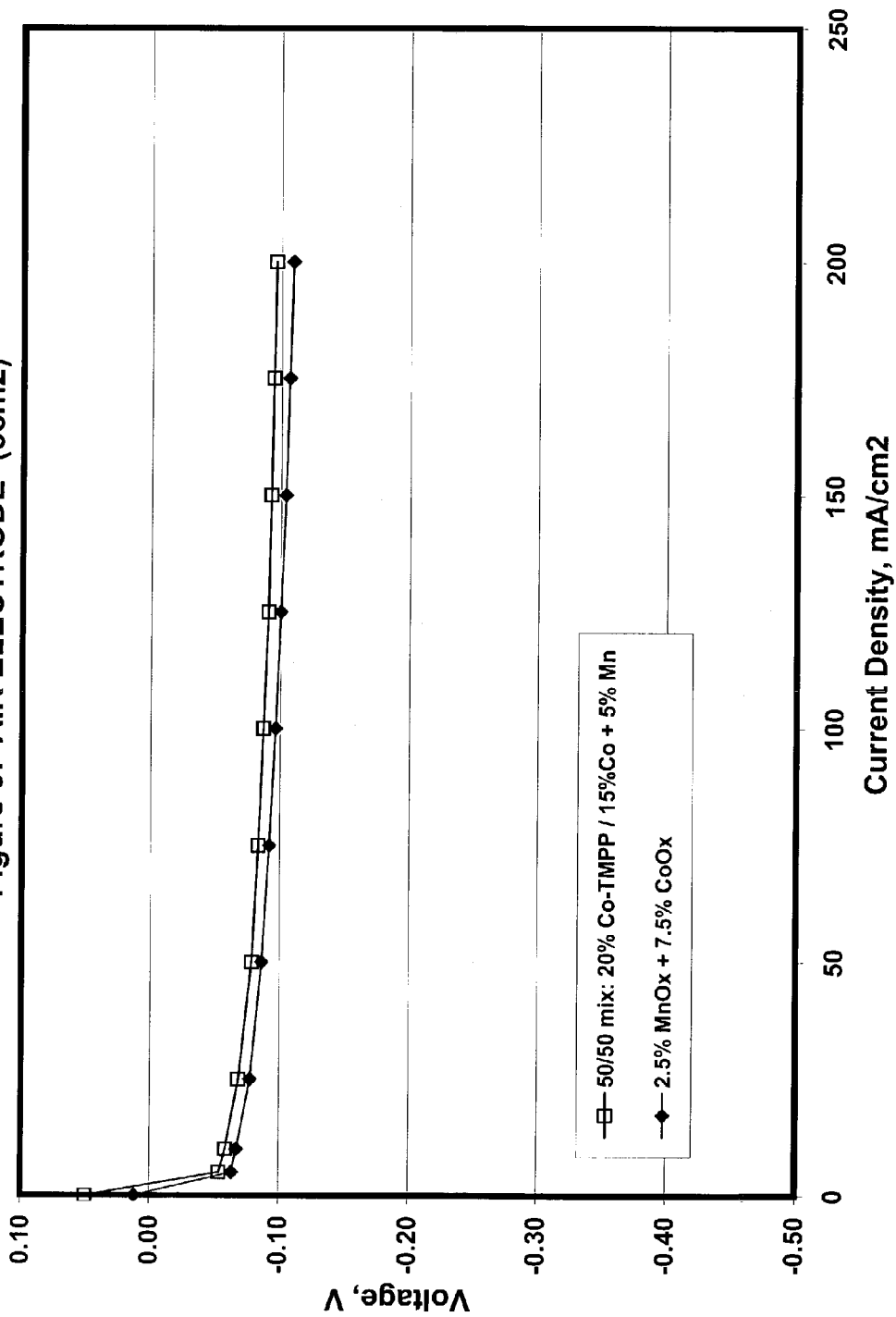

CATALYST FOR FUEL CELL OXYGEN ELECTRODES

FIELD OF THE INVENTION

The present invention pertains generally to catalysts and more particularly to oxygen reduction catalysts. In particular, the present invention relates to catalysts that may be used in oxygen electrodes of fuel cells.

BACKGROUND

With the increasing need to develop alternative forms of energy to address the problems of pollution and the dependence on oil, fuel cells have received increasing attention as a premier source of clean and quiet power. However, due to the costs associated with the materials that go into making these fuel cells, they are not economically feasible for use in many applications.

There are several competing fuel cell technologies. These technologies include alkaline fuel cells, proton exchange membrane (PEM) fuel cells, etc. Although each technology possesses certain advantages over the other, alkaline fuel cells offer the potential for higher power capability, high operating efficiency and lower cost of manufacture.

In an alkaline fuel cell, the reaction at the hydrogen electrode occurs between hydrogen and hydroxyl ions (OH⁻) present in the electrolyte that form water and release electrons:

$$H_2 + 2OH^- \rightarrow 2H_2O + 2e^-.$$

The oxygen reduction reaction typically takes place via a 2 step reaction, each step providing a 2 electron transfer. In other cases, such as with the use of pure platinum, it has been reported that oxygen reduction may be accomplished via a single step, 4 electron transfer. However, once the platinum is exposed to an impurity, the direct 4-electron transfer may not be realized.

The consequence of the two-step reduction process is the formation of peroxyl ions:

$$O_2 + H_2O + 2e \rightarrow HO_2^- + OH^-. \quad (1)$$

$$HO_2^- + H_2O + 2e \rightarrow 3OH^-. \quad (2)$$

Overall: $O_2 + 2H_2O + 4e \rightarrow 4OH^-$.

Although the final reaction is ultimately hydroxyl ion formation, formation of intermediate species can be very problematic. Peroxyl ions are very reactive and can oxidize many materials. In a porous oxygen diffusion electrode where the electrochemical reactions are taking place at the surface, the formation of peroxyl ions becomes detrimental to the performance of the fuel cell. The pores at the electrode surface provide sites for oxygen reduction as long as the pores are accessible to the electrolyte. Once the oxygen reduction takes place, peroxide formation as an intermediate of the product of reaction occurs within the pores. Since the pores are not through-hole pores, the peroxide has no way to escape except by diffusion into the bulk. Bulk diffusion can be a rather slow process. During this time, peroxide can (1) oxidize the teflonized carbon, (2) decompose and form gas bubbles that can block the pores causing a loss of surface area, and (3) react with the active catalyst material to destroy its character. All three of these factors can lead to gradual flooding and a loss of performance within the oxygen electrode. Thus, the effect of peroxide formation/reaction can be observed as a gradual increase in polarization and a sudden loss of performance.

Catalysis primarily occurs at certain favorable locations called active sites. It has generally been taught that these active sites can be altered to increase the performance of catalysis. For example, as described in U.S. Pat. No. 5,536,591 to Fetcenko et al., entitled Electrochemical Hydrogen Storage Alloys For Nickel Metal Hydride Batteries, catalyst type, state, size, proximity, porosity and topology are several factors that can be altered to engineer new catalysts. The '591 patent and its progeny, demonstrate that small sized catalytic particles, such as 50 to 70 angstroms, can be formed in an oxide support within a very small proximity to one another, such as within 2 to 300 angstroms. Such catalysts have revolutionized the NiMH battery industry.

Catalysts can be either supported or non-supported. Supported catalysts are those that have the catalyst fixed to a carrier matrix, while non-supported catalysts are those that are free from any carrier matrix. Examples of supported catalysts include metals supported on carrier matrices such as refractory oxides, carbon, or silicon dioxide. Examples of non-supported catalysts include spongy metal catalysts, such as Raney nickel, spinels, or other fine metal powders, such as platinum, gold, palladium, silver, etc. There presently exist a multitude of supported catalysts, which have been designed for specific uses. Below are several examples of these catalysts.

Catalysts have been developed for the treatment of wastewater. See for example, U.S. Pat. No. 4,670,360 to Habermann et al., entitled Fuel Cell. Habermann et al., which discloses a fuel cell having an activated carbon-containing anode and an activated carbon-containing cathode for use in the oxidative treatment of wastewaters containing oxygen or oxygen containing compounds. The patent describes using graphite and active carbon as a carrier support.

Catalysts have been developed for the cathodic evolution of hydrogen in electrolysis plants. See for example, U.S. Pat. No. 3,926,844 to Benczur-Urmossy, entitled Catalysts For The Cathodic Hydrogen Development. Benczar-Urmossy, which describes depositing X-ray-amorphous boride compound of nickel, cobalt or iron on a supporting structure. The compound is deposited from an aqueous solution having metallic ions such as nickel ions, cobalt ions, or iron ions, with a complexing agent and a water-soluble borate or borazane at a temperature of below 60° C.

Catalysts have been developed for use in hydrocracking gas oil. See for example U.S. Pat. No. 4,686,030 issued to Ward, entitled Mild Hydrocracking with a Catalyst Having A Narrow Pore Size Distribution, which discloses metal oxide catalysts supported on a calcined oxide support. The catalyst may be made by extruding a gamma alumina-containing material through a die, drying the alumina, and breaking the alumina into pieces to form the support. The support is then impregnated with nickel nitrate hexahydrate and ammonium heptamolybdate dissolved in phosphoric acid, dried and calcinated.

Catalysts have been developed for use in air cathodes for electrochemical power generation. See for example, U.S. Pat. No. 6,368,751 B1 to Yao et al., entitle Electrochemical Electrode For Fuel Cell. Yao et al. discloses an electrochemical cathode including a porous metal foam substrate impregnated with a mixture of carbon, CoTMPP, and Teflon.

A number of techniques for making catalysts have also been developed. These techniques include impregnating, coating, or simply mixing metal powder in with a support. See for example, U.S. Pat. No. 4,113,658 to Geus, entitled Process for Homogeneous Deposition Precipitation of Metal Compounds on Support of Carrier Materials, which discloses a method of making supported catalysts by precipitating a metal salt solution onto a carrier matrix.

Another technique for making catalyst was taught by Ovshinsky et al. in U.S. Pat. No. 4,544,473, entitled Catalytic Electrolytic Electrode, which describes making amorphous, catalytic bodies by various deposition techniques.

Catalysts can also be made by depositing organometallic catalysts onto a support and then removing the organic material by heating at a relatively high temperature. See for example, U.S. Pat. No. 4,980,037, entitled Gas Diffusion Cathodes, Electrochemical Cells and Methods Exhibiting Improved Oxygen Reduction Performance, to Hossain et al.

Because the design of each catalyst is often the limiting factor to its ultimate end use, there continues to be a need for new and improved catalysts and ways for making them. Furthermore, if fuel cells are to become cost competitive with other forms of power generation, high efficiency, low cost catalysts for use in these fuel cells needs to be provided.

SUMMARY OF THE INVENTION

The present invention addresses one or more of the above-mentioned deficiencies and/or others by providing atomically engineered catalysts based on Ovshinsky's principles of atomic engineering to produce unusual orbital interactions and new chemical properties. The catalyst includes a catalytically active material supported on a carrier matrix. The catalytically active material may comprise mixed-valence nanoclustered metal oxide(s), an organometallic material, or a combination thereof. These catalysts may be particularly useful for improved oxygen reduction, polarization, and peroxide decomposition in a cathode of a fuel cell, such as an alkaline fuel cell.

In one embodiment of the present invention there is provided a supported catalyst comprising a carrier matrix and catalytically active material including a mixed-valence, nanoclustered metal oxide. The catalytically active material is preferably substantially uniformly distributed about and supported by the carrier matrix.

In another embodiment of the present invention there is provided a supported catalyst comprising a carrier matrix and catalytically active material including an organometallic. The catalytically active material is preferably substantially uniformly distributed about and supported by the carrier matrix.

In another embodiment of the present invention there is provided a supported catalyst comprising a carrier matrix and catalytically active material distributed about the carrier matrix, wherein the catalytically active material includes a mixed-valence, nanoclustered metal oxide and an organometallic. The catalytically active material is preferably substantially uniformly distributed about and supported by the carrier matrix.

In another embodiment of the present invention there is provided a supported catalyst comprising a carrier matrix and catalytically active material including mixed-valence, nanoclustered metal oxide and an organometallic, where the mixed-valence, nanoclustered catalyst is supported on the organometallic catalyst. Alternatively, the organometallic may be supported on the mixed-valence nanoclustered metal oxide. The catalytically active material is preferably uniformly distributed about and supported by the carrier matrix.

In still another embodiment of the present invention there is provided a composite catalyst. The composite catalyst includes a first catalytically active material on a first carrier matrix and a second catalytically active material on a second carrier matrix. The carrier matrices with their respective catalysts are preferably mixed or blended together. The composite catalyst preferably includes mixed-valence, nanoclustered metal oxide substantially uniformly distributed about and supported by a first carbon based carrier matrix and an organometallic substantially uniformly distributed about and supported by a second carbon based carrier matrix.

For a more complete understanding of the invention, reference is now made to the following Brief Description of the Drawings and Detailed Description of Preferred Embodiments.

BRIEF DESCRIPTION OF THE DRAWINGS

FIG. 8 is a graphical comparison of the performance of a catalyst in accordance with an embodiment of the present invention and others; and FIG. 9 is a graphical comparison of the performance of a catalyst in accordance with an embodiment of the present invention.

DETAILED DESCRIPTION OF PREFERRED EMBODIMENTS OF THE INVENTION

Figure 1:
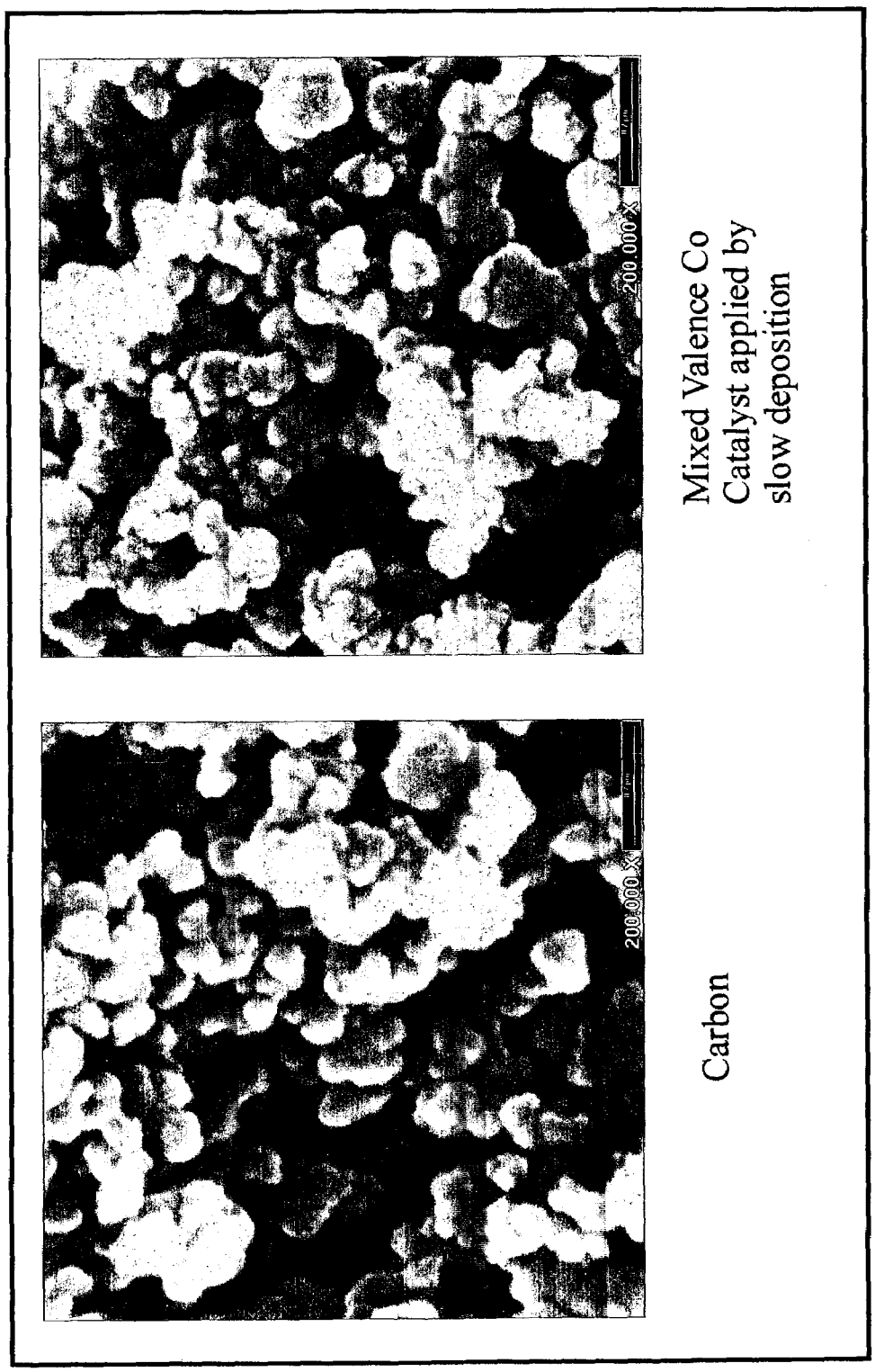
FIG. 1 is a SEM of catalytically active material in accordance with the present invention.

In accordance with the present invention, there is described herein a catalyst which can be used for oxygen reduction. The catalyst comprises a catalytically active material supported on a carrier matrix. The catalytically active material may comprise mixed-valence, nanoclustered metal oxide(s), an organometallic material, or a combination thereof. The catalytically active material is preferably provided at a loading of: 30% by weight or less, 20% by weight or less, 10% by weight or less, 5% by weight or less, but more preferably at a loading of 1% to 5% by weight. The catalyst may be particularly useful for enhancing the rate of oxygen reduction in an oxygen electrode of a fuel cell. The catalyst may also be useful for catalyzing hydrogenation, hydro-cracking, hydrogen oxidation, reduction alkylation, ammonolysis, and electrochemical reactions.

As mentioned above, the catalytically active material may comprise a mixed-valence, nanoclustered metal oxide. Mixed-valence, nanoclustered metal oxides can provide a diverse range of active sites for enhancing the rate of a multi-step reaction. Mixed-valence oxide is any mixture of oxides of more than one valence state. The valence states preferably include more than one of the +1, +2, +3, +4, +5 and +6 oxidation states. The mixed-valence, nanoclustered metal oxide may include oxides having a plurality of valence states, such as two, three, four or more different valence states. The average valence of any particular nanocluster may be between 0 and +5, 0 and +1, +1 and +2, +2 and +3, +3 and +4 and +4 and +5. A preferred mixed-valence nanoclustered metal oxide is from +1 to +3. The nanoclusters may include a higher concentration of metal atoms in a lower oxidation state than metal atoms in a higher oxidation state. The ratio of atoms in the higher oxidation state to the atoms in the lower oxidation state may range from 1:4 to 3:4, preferably 1:3 to 2:3, or more preferably 1:2 to 2:3. Providing nanoclusters with a higher concentration of metal atoms having a lower valence state than higher valence state can allow for a more favorable reaction rate in a multi-step reaction mechanism.

The mixed-valence, nanoclustered metal oxide may be multi-functional. A multi-functional catalyst has one component that provides a rate of reaction that favors a first reaction step and another component that provides a rate of reaction that favors a second reaction step over the first. By providing a multi-functional catalytically active material, complex reactions having multiple steps can be more effectively driven.

The mixed-valence, nanoclustered metal oxide may be multicomponent. A multicomponent nanoclustered metal oxide has more than one element. Preferred multicomponent nanoclustered metal oxides have two or more, three or more or even four or more elements. Preferred elements include those selected from the transition metals, such as nickel, cobalt, manganese, etc. Preferred elements include those that provide hydrogenation catalysis. Mulitcomponent nanoclusters can provide improved catalytic activity for complex reactions and can synergistically interact to outperform single element, uniform clusters. The multiple elements may be provided in solid solution to form the multicomponent oxide. Preferred multicomponent oxides include those that are mostly cobalt oxide, mostly nickel oxide or mostly manganese oxide. Preferred multicomponent oxides include cobalt-manganese oxide, cobalt-nickel, nickel-manganese oxide, cobalt-manganese-nickel oxide or mixtures. The multicomponent oxide may include one or more of the noble metals, such as Ag, Au, Pt, etc. However, due to the costs associated with using noble metals and the performance that can be achieved without them, the multicomponent oxide preferably includes less than 10%, more preferably less than 2% and more preferably less than 1% noble metals by weight. A preferred multicomponent metal oxide is essentially noble metal free.

Nanoclusters are small regions in the nanometer size range of >0 nm to 1000 nm. Preferrably, the nanoclusters are 0.5–50 nm in size, and more preferably 10 to 300 Å in size. The nanoclusters may be partially crystalline, polycrystalline, microcrystalline, nanocrystalline, essentially amorphous, or amorphous. The nanoclusters may be formed of small crystallites or grains which themselves may be highly ordered oxides in the size range of 10–1000 Å. The nanoclusters may be agglomerated to form a continuous or substantially continuous coating that has a thickness that is on the nanometer scale, e.g. of >0 nm to 1000 nm thick. The nanoclusters may be regions of varying thickness or density, such as thicker or denser towards the middle of a cluster. Regions of varying thickness permit the topology of the nanoclusters to be altered to increase surface area and catalytic activity. The nanoclusters may include small grains of differing orientation. Having nanoclusters with small grains of differing orientation can permit stacking of grains to increase the number and availability of grain boundaries to improve catalytic activity. The nanoclusters may include 10 to 100 crystallites or grains each. The grains may have a diameter of 150 Å or less, preferably 100 Å or less, but are preferably from 5 to 20 Å. Nanoclusters having a small grain size permit greater accessibility of reactants to the active sites. The grains may have a spinel crystal structure. The nanoclusters may be highly ordered oxides, such as 100 Å–500 Å in size. Highly ordered oxides can have the properties of metals to provide enhanced catalytic activity, but are not in the 0 oxidation state. The nanoclusters or agglomerations of nanoclusters preferably have a high density. A high density may be provided by having nanoclusters or agglomerations of nanoclusters in close proximity to one another. A high density of nanoclusters provides additional active sites for improved catalytic activity. The proximity of nanoclusters and/or agglomerations preferably includes spacing of 1 to 100 Å and more preferably 2 to 40 Å. The shape, size, form, proximity, density and ultimate activity of the nanoclusters may be controlled by the method of forming. By changing the method of how the nanoclusters are formed: the size, shape, density, grain stacking, and topology of the clusters can be atomically engineered.

The mixed-valence, nanoclustered catalytic material may be formed about the carrier matrix by any suitable means, such as by precipitation, electrodepositing, impregnation, electroless deposition, sputtering, etc. The catalytic material is preferably formed with a low temperature deposition, such as below 80° C., or at a temperature suitable for forming the catalyst without altering the catalytic material or the carrier matrix. The nanoclusters may be formed on, absorbed to, bonded rigidly thereto, dispersed about, electrostatically held, or simply contact the carrier matrix. The carrier matrix in turn may support the catalytically active material directly or indirectly. The mixed-valence, nanoclustered metal oxides are preferably formed on a carrier matrix via electroless deposition. More preferably, a controlled precipitation process that includes forming a metal complex and breaking down the complex in a controlled manner to form the nanoclusters is used. By controlling the manner and rate in which the catalytically active material is formed, different properties for materials having the same chemical composition can be provided.

A controlled precipitation process may be provided by dissolving a metal salt into a solution to form a metal salt solution and combining the metal salt solution with a complexing agent to form a metal complex. The metal complex may then be combined with a suspension of the carrier matrix. The complex may be broken down in a controlled manner by reducing the strength of the complex to electrolessly deposit an oxide about the carrier matrix. For example, a carrier matrix, such as carbon black, may be wetted with an organic solvent, such as a polar organic solvent like acetone, to form a suspension. A metal complex can then be combined with the wetted carbon and aggressively mixed. An agent, such as an acid or base, can then be added to the combination to break down the metal complex so that a catalyst forms on the carbon. The formation of the catalyst may be done in an ultrasonic bath using sonication. The catalyst may then be separated from any excess solution, dried and/or heat treated as desired.

The controlled precipitation may be done at a fast or slow rate. A fast deposition rate deposits the catalytically active material about the carrier matrix in 24 hours or less, while a slow deposition rate deposits the catalytically active material about the carrier matrix in more than 24 hours. It has been found that by altering the rate at which nanoclusters are formed, the activity of the catalyst can be changed. Preferably, deposition is done at the slow rate. Deposition rates may be adjusted in a number of ways, such as by altering temperatures, concentrations, pH, the amount of the complex present, etc. Deposition rate may also be controlled by increasing or decreasing the rate at which the metal complex is weakened. For example, a complex may be prepared by adding a metal salt to excess ammonium hydroxide and then reducing the excess ammonium ion. Further, the reaction may be controlled by adjusting the concentration of ammonium in the headspace. By increasing or decreasing the amount of ammonium in the headspace, the deposition rate and/or crystallite size of the catalyst may be controlled.

The catalytically active material may include an organometallic. The organometallic is preferably a macrocycle including one or more transition metals, such as cobalt tetramethoxyphenyl porphyrin (CoTMPP), manganese tetramethoxyphenyl porphyrin (MnTMPP) or cobalt/manganese tetramethoxyphenyl porphyrin (CoMnTMPP). The organometallic may be atomically layered on the carrier matrix. Atomically layering the organometallic provides active sites for catalytic activity without isolating the underlying material. Atomic layering can also be used to adjust the proximity of the organometallic to adjacent materials to alter the overall chemistry of active sites, such as atomically layering the organometallic next to nanoclusters or other catalytically active materials.

The organometallic may be formed about the carrier matrix in any suitable way, such as directly onto the carrier matrix or onto a material supported by the carrier matrix, such as onto mixed-valence, nanoclustered metal oxides. The organometallic may be formed about the carrier matrix by first preparing a solution of organometallic material and then combining the solution with the carrier matrix. The solution preferably includes an organic solvent. A preferred solvent is a polar organic solvent, such as acetone, however, other organic solvents may be substituted depending upon the organometallic's solubility and the carrier matrix.

A preferred embodiment of the method for making an organometallic catalyst includes, creating a suspension of the carrier matrix and adding a solution of organometallic to the suspension. The resulting suspension is preferably agitated for a substantial period of time, such as at least 24 hours. The catalyst may then be separated from any excess solution (such as by decanting or filtering), dried and/or heat treated as desired. Heat-treating can be used to alter the organic support structure. Heat-treating may be used to alter the catalytically active material by removing organic portions of the organometallic. Heat-treating may be accomplished by heating the catalyst in an inert gas, or a reducing atmosphere, depending on the desired valence states of the catalytically active material and the residual surrounding organic structure.

The carrier matrix may be any suitable support material based on the reaction medium of the ultimate end use. The carrier matrix is preferably carbon based. A carbon based carrier matrix is particularly useful for supporting catalytically active material in a fuel cell oxygen electrode because of its ability to help dissociate molecular oxygen into atomic oxygen. The carrier matrix is preferably an agglomerated, filamentary carbon based material. The carrier matrix may include a plurality of strands having a diameter of 20 μm or less. The carrier matrix preferably has a low density and/or high surface area. The carrier matrix may be a banded linear structure with an ill defined boarder, such as fluffy carbon, or may be stratified in one or more directions. The carrier matrix may be intertwined with non-distinct edges having a vertical extent which goes into the middle of the carrier region with a more dense matrix embedded towards the center of the mass. The carrier matrix may also/or alternatively have a distinct up and down wavelike pattern, may be uniform, diffuse or wispy with distinct edges. By having a dispersed carbon matrix, increased surface area can be provided while maintaining adequate support and accessibility of the catalytically active material.

In a preferred embodiment of the present invention, the catalyst comprises mixed-valence, nanoclustered metal oxide distributed about and supported by a carrier matrix and organometallic material distributed over the mixed-valence, nanoclustered metal oxide. A catalyst having an organometallic distributed over nanoclusters may be made by depositing the nanoclusters about a carrier matrix and then supplying the organometallic about the nanoclusters using one or more of the above procedures. By using two or more different catalytically active materials about the same carrier matrix in close proximity to one another, new and different chemistries can be achieved.

In another preferred embodiment of the present invention, the catalyst comprises organometallic material distributed about and supported by a carrier matrix and mixed-valence, nanoclustered catalysts substantially distributed over the organometallic material. A catalyst having nanoclusters distributed over organometallic material may be made by dispersing the organometallic material over a carrier matrix and then supplying the nanoclusters over the organometallic material using one or more of the procedures described above. By using two or more different catalytically active materials about the same carrier matrix in close proximity to one another new and different chemistries can be achieved.

In another preferred embodiment of the present invention there is provided a composite mixture of catalytic material that includes mixed-valence, nanoclustered metal oxides distributed about and supported by a first carrier matrix and organometallic material substantially uniformly distributed over and supported by another carrier matrix. The composite catalyst may be made by making mixed-valence, nanoclustered metal oxide catalyst as described above and making an organometallic catalyst as described above and blending the two together. A composite catalyst can provide improved catalytic activity for complex reactions.

The catalysts described above may be used in an oxygen electrode. The oxygen electrode may include a carbon matrix supported by a current collector. A carbon matrix can provide 1) a porous matrix with pathways for oxygen to travel to the electrolyte contacting side of the oxygen electrode and 2) enhance the dissociation of molecular oxygen into atomic oxygen. The current collector provides a conductive pathway for current to travel. The current collector preferably extends throughout the entire oxygen electrode. The current collector is preferably in electrical communication with the catalytically active material, and may be in direct contact therewith. The current collector may comprise an electrically conductive mesh, grid, foam, expanded metal, or combination thereof. For example, a preferable current collector comprises a conductive mesh having about 40 wires per inch or less horizontally and about 20 wires per inch or less vertically. The wires comprising the mesh may have a diameter between 0.005 inches and 0.01 inches, preferably between 0.005 inches and 0.008 inches. This design provides enhanced current distribution due to the reduction of ohmic resistance.

The oxygen electrode may be formed in the same manner as a conventional oxygen electrode, where the active catalyst material described above is substituted at least partly for conventional catalyst. In such a case, one or more catalyst as described above may be formed into the porous carbon material of the conventional electrode.

Figure 7:
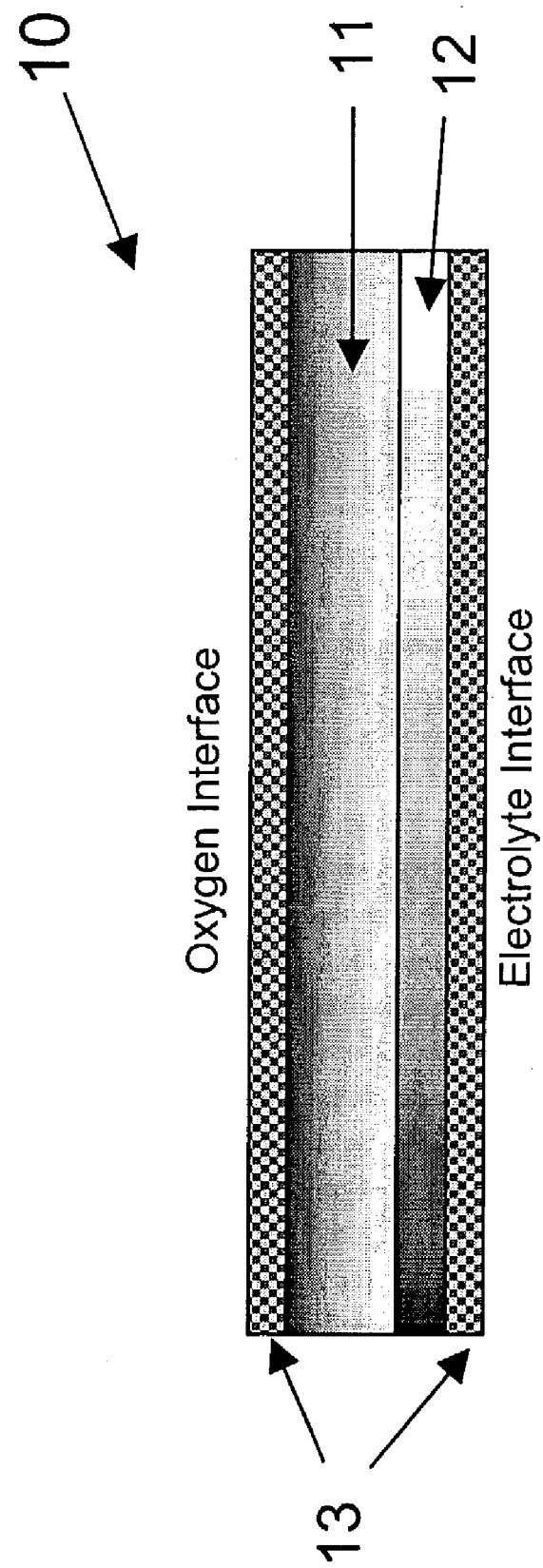
FIG. 7 is a cross-sectional view of an oxygen electrode in accordance with an embodiment of the present invention.

Referring now to FIG. 7, depicted therein at 10 is a fuel cell oxygen electrode according to a preferred embodiment of the present invention. As shown therein, the electrode 10 has a layered structure. A layered structure promotes oxygen dissociation and resistance to flooding within the oxygen electrode. The oxygen electrode 10 includes a gas diffusion layer 11, an active material layer 12, and at least one current collector 13. The active material layer contains a catalyst. The gas diffusion layer and the active material layer may be placed adjacent to one another with the current collector 13 being placed in contact with the active material layer. Alternatively, the current collector may be placed outside the gas diffusion layer 11 and the active material layer 12 to form a sandwich configuration. When used inside a fuel cell, the active material layer 12 may be placed in contact with the electrolyte solution while the gas diffusion layer 11 may be placed in contact with the air or oxygen stream.

The oxygen electrode preferably has a hydrophobic component, which provides a barrier for isolating the electrolyte, or wet, side of the oxygen electrode from the gaseous, or dry, side of the oxygen electrode. The hydrophobic component may include a halogenated organic polymer compound, such as polytetrafluoroethylene (PTFE). The hydrophopic component may be combined with carbon particles in the gas diffusion layer 11 to provide the barrier. The barrier may also be formed with carbon particles coated with a polymer compound, such as PTFE coated carbon particles. The carbon particles may be carbon black, such as Vulcan XC-72 carbon (Trademark of Cabot Corp.), Acetylene Black, etc. The gas diffusion layer may contain approximately 30–60 percent by weight of polymer with the remainder consisting of carbon particles.

The active material layer 12 is supported by the current collector and may be composed of coated carbon particles and catalytically active material as described above. The coated carbon particles are preferably coated with polytetrafluoroethylene, which preferably contain approximately >0–20% polytetrafluoroethylene by weight. The catalytically active material may be blended with the coated carbon particles, deposited on the coated carbon particle or deposited directly to the electrode to form a layer of the active catalyst material on the surface of the active material layer. The thickness of this layering may be anywhere from 30 Angstroms or less to as thick as 2 microns or more, depending upon the activity of the chosen material and the requirements of the end use (i.e. such as a fuel cell).

EXAMPLES 1. 5 wt % CoOx loaded on Carbon (●)
   I. 250 cc of $NH_4OH$ (ammonia) was added to 25 g of carbon under ultrasonic agitation.
   II. 3.75 g $CoSO_4$ was dissolved in 100 ml of water.
   III. Once the carbon was completely wetted, II was added to I under ultrasonic agitation.
   IV. Dilute NaOH solution was added to III under ultrasonic agitation over several hours.
   V. The end material was filtered and then rinsed with water.
   VI. The rinsed material was dried overnight at ~80° C.
   The procedure produced supported, mixed-valence nanoclustered Co oxide catalyst.

Figure 2:
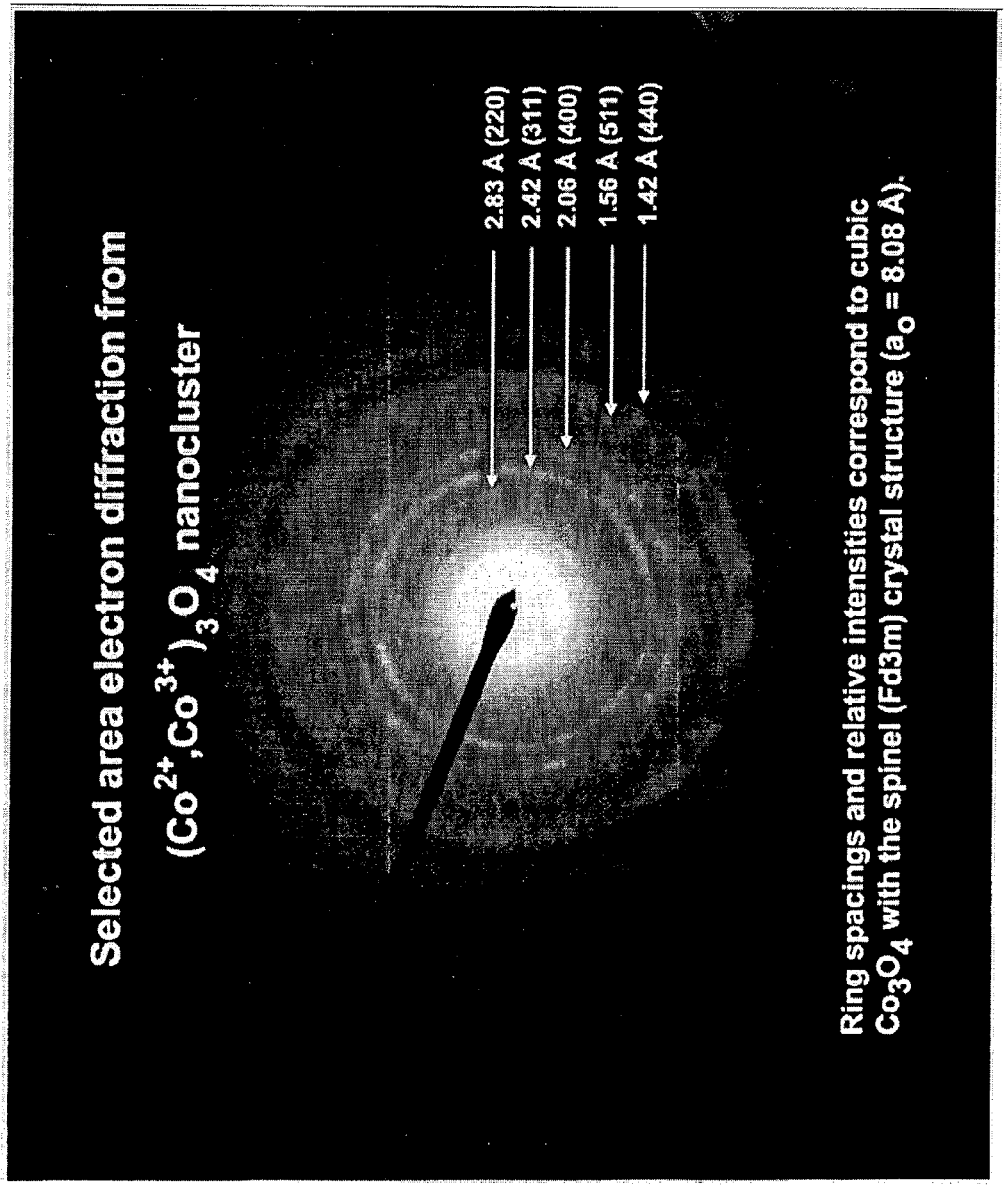
FIG. 2 is a selected area electron diffraction pattern of $(Co^{2+}, Co^{3+})_3O_4$ mixed-valence, nanoclustered metal oxide in accordance with an embodiment of the present invention.
Figure 3:
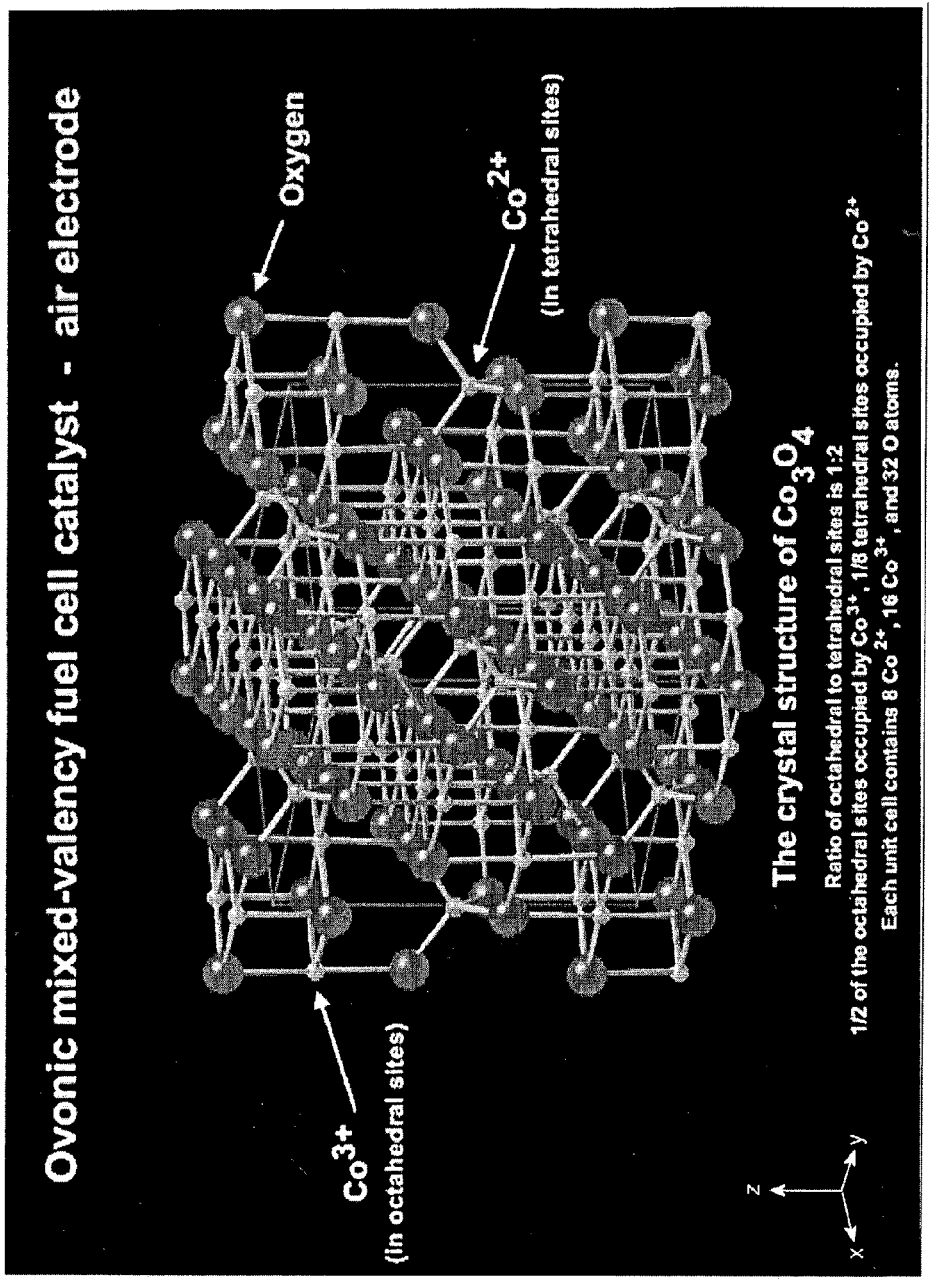
FIG. 3 is a three dimensional view of a crystal structure for a $(Co^{2+}, Co^{3+})_3O_4$ mixed-valence, nanoclustered metal oxide in accordance with an embodiment of the present invention.
Figure 4:
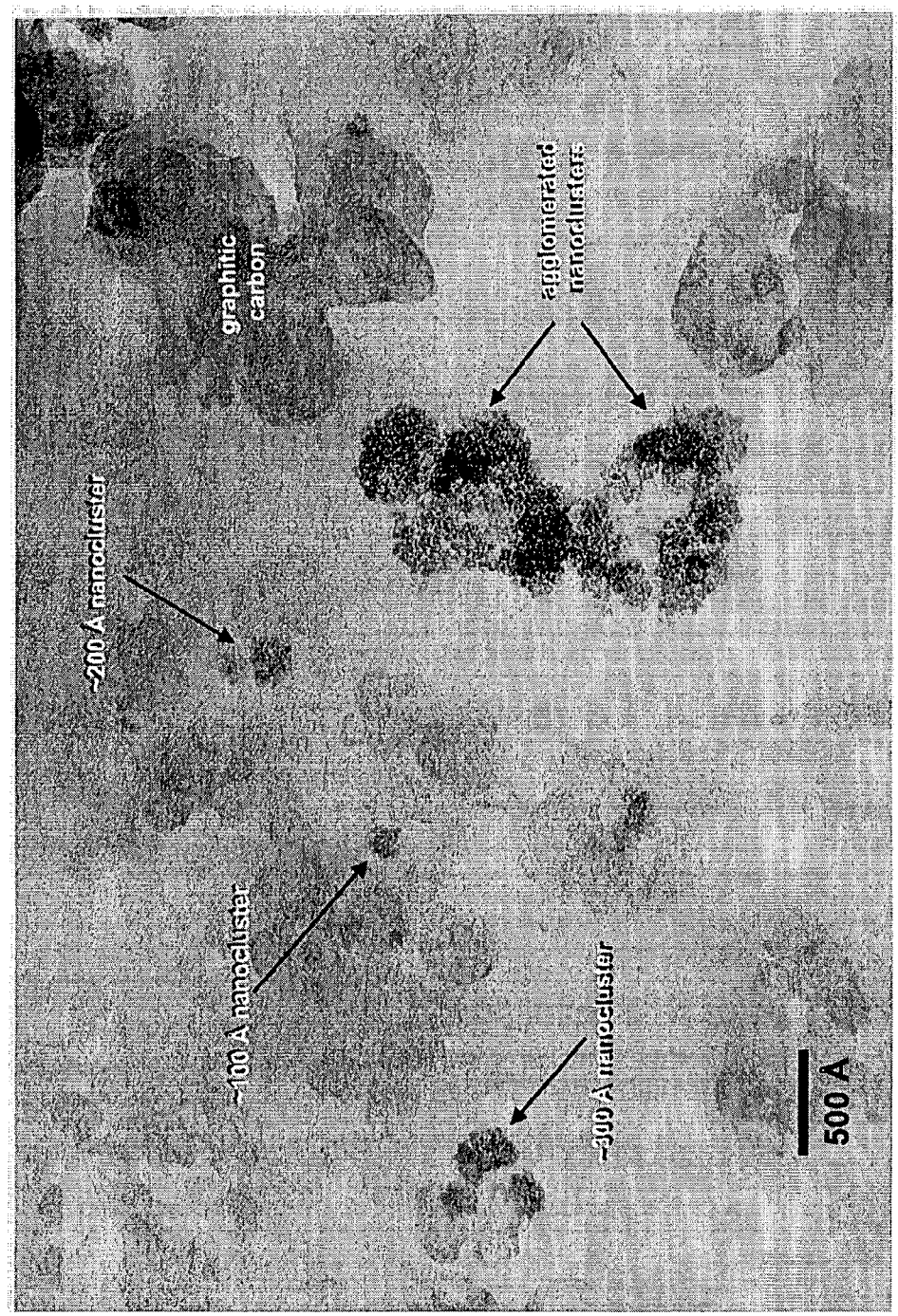
FIG. 4 is a TEM of a mixed-valence, catalytic material supported on a carrier matrix in accordance with an embodiment of the present invention.
Figure 5:
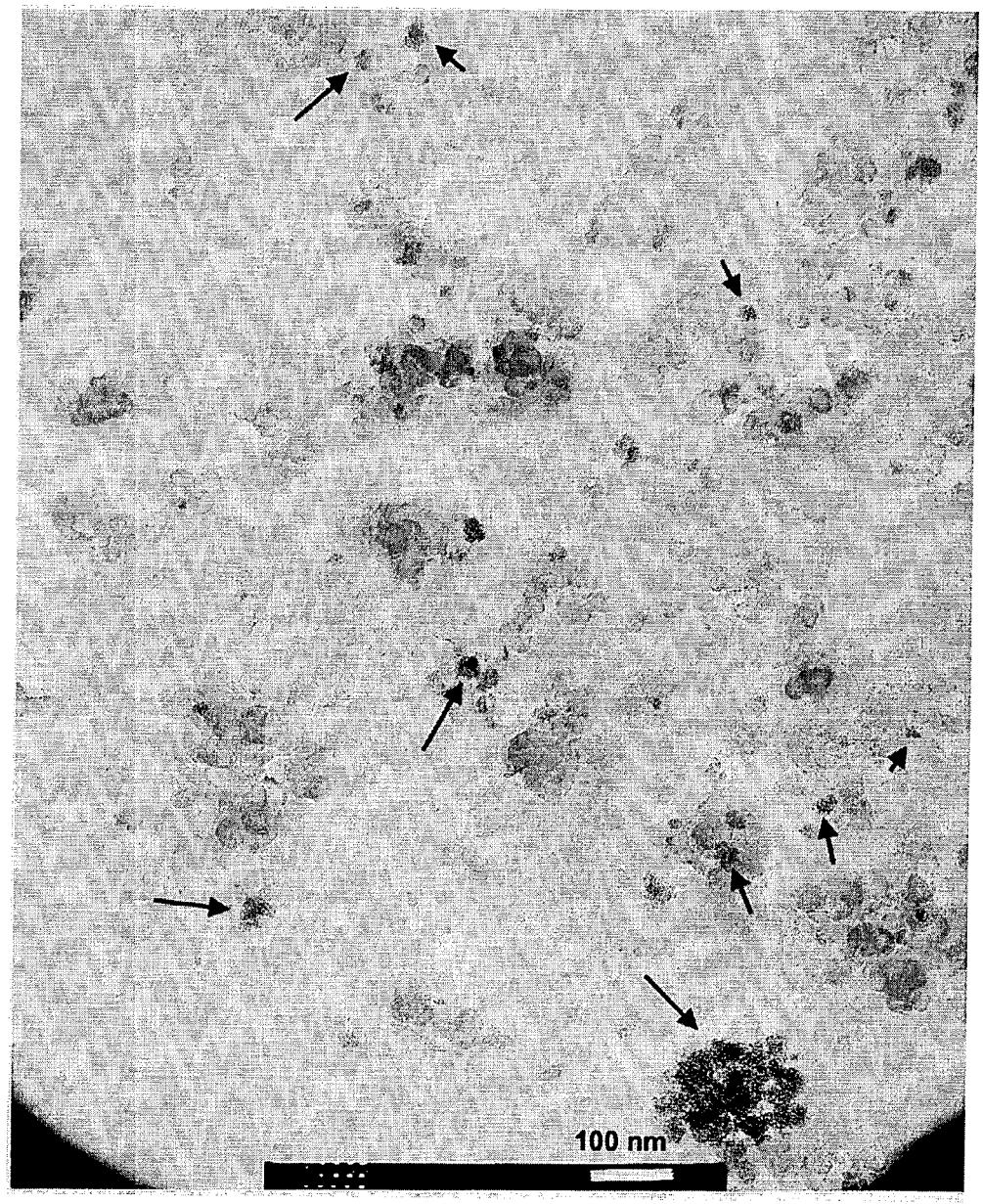
FIG. 5 is a TEM of mixed-valence, catalytic material supported on a carrier matrix in accordance with an embodiment of the present invention.
Figure 6:
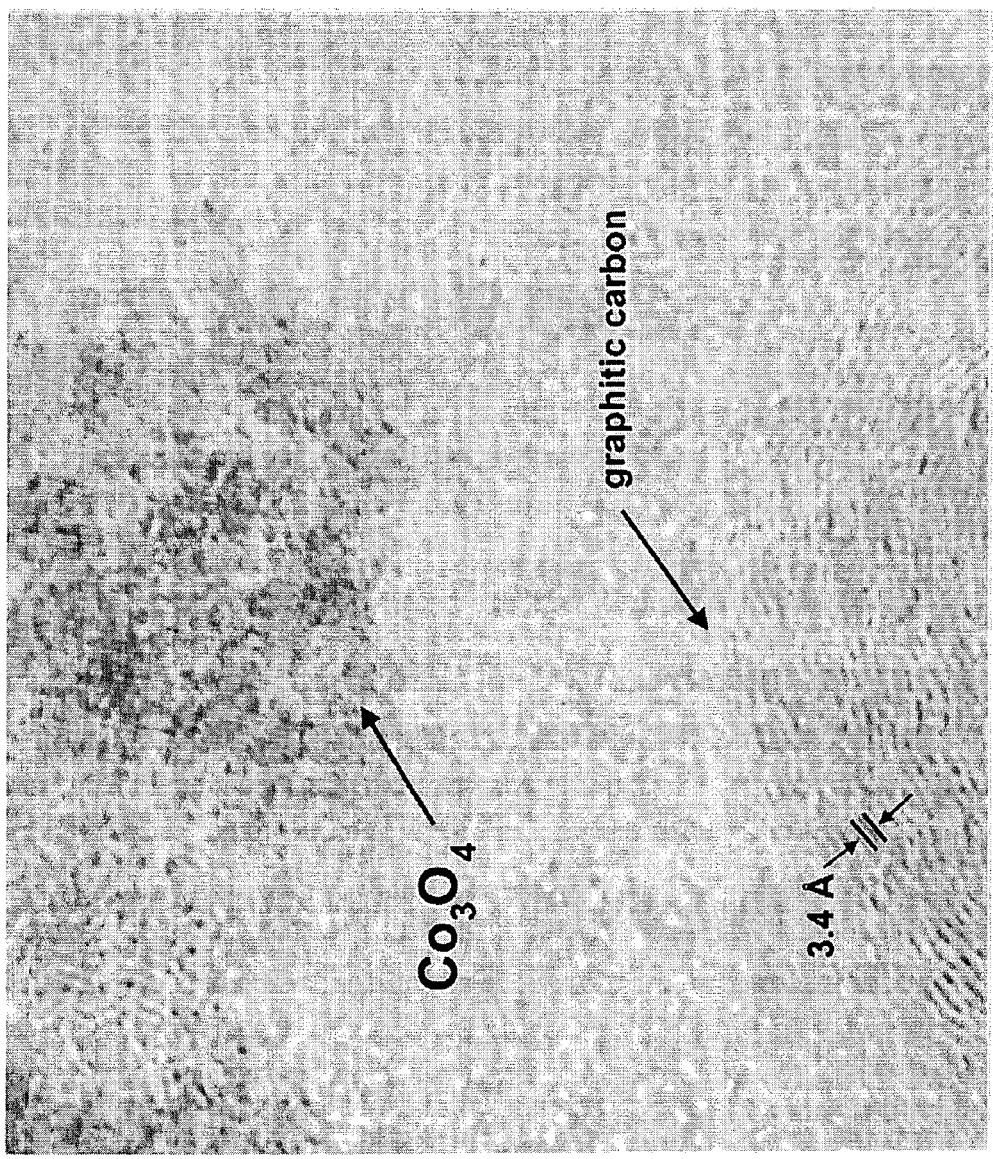
FIG. 6 is a TEM of mixed-valence, catalytic material supported on a carrier matrix in accordance with an embodiment of the present invention.

A catalyst produced in accordance with Example 1, above was submitted to SEM testing and the results are shown FIG. 1. The material was submitted to X-ray analysis to determine crystal structure. FIG. 2 shows a selected area electron diffraction pattern and FIG. 3 shows a model of a crystal structure for a mixed-valence, metal oxide. The sample was submitted to TEM analysis and the images are shown in FIGS. 4, 5, and 6 under various magnifications.

2. 5 wt % MnOx loaded on Carbon (■)
   I. 250 cc of $NH_4OH$ (ammonia) was added to 25 g of carbon under ultrasonic agitation.
   II. 2.49 g $MnSO_4xH_2O$ was dissolved in 100 ml of water.
   III. Once the carbon was completely wetted, II was added to I under ultrasonic agitation.
   IV. Dilute NaOH solution was added to III under ultrasonic agitation over several hours.
   V. The resulting material was filtered and then rinsed with water.
   VI. The rinsed material was dried overnight at ~80° C.
   The procedure produced supported 5 wt % nanoclustered, mixed-valence, Mn oxide catalyst.

The supported catalysts above were formed into oxygen electrodes for use in a power generating alkaline fuel cell and compared in side-by-side tests, of current Density (mA/cm2) vs. Potential (V) as shown in FIG. 8. As shown, the electrodes, even though formed without noble metal or platinum catalysts, performed well.

3. 10 wt % MnOx loaded on Carbon (▲)
   I. 250 cc of $NH_4OH$ (ammonia) was added to 25 g of carbon under ultrasonic agitation.
   II. 5.28 g $MnSO_4xH_2O$ was dissolved in 100 ml of water
   III. Once the carbon was completely wetted, II was added to I under ultrasonic agitation.
   IV. Dilute NaOH solution was added to III under ultrasonic agitation over several hours.
   V. The resulting material was filtered and then rinsed with water.
   VI. The rinsed material was dried overnight at ~80° C.

4. 5 wt % MnOx+5 wt % CoOx loaded on Carbon (▲)
   I. 600 cc of $NH_4OH$ (ammonia) was added to 60 g of carbon under ultrasonic agitation
   II. Dissolve 6.3 g $MnSO_4xH_2O$+10.2 g $CoSO_4$ in 100 ml of water
   III. Once the carbon was completely wetted, II was added to I under ultrasonic agitation
   IV. Dilute NaOH solution was added to III under ultrasonic agitation over several hours.
   V. The resulting material was filtered and then rinsed with water.
   VI. The rinsed material was dried overnight at ~80° C.

5. 2.5 wt % MnOx+7.5 wt % CoOx loaded on Carbon (○)
   I. 600 cc of $NH_4OH$ was added to 60 g of carbon under ultrasonic agitation.
   II. 3.15 h $MnSO_4xH_2O$+15.46 g $CaSO_4$ were dissolved in 100 ml of water.
   III. Once the carbon was completely wetted, II was added to I under ultrasonic agigation.
   IV. Dilute NaOH solution was added to III under ultrasonic agitation over several hours.
   V. The resulting material was filtered and then rinsed with water.
   VI. The rinsed material was dried overnight at ~80° C.

6. 7.5 wt % MnOx+2.5 wt % CoOx Loaded on Carbon
   I. 600 cc of $NH_4OH$ (ammonia) was added to 60 g of carbon under ultrasonic agitation.
   II. 9.5 g $MnSO_4xH_2O$+5.13 g $CoSO_4$ were dissolved in 100 ml of water III. Once the carbon was completely wetted, II was added to I under ultrasonic agitation IV. Dilute NaOH solution was added to III under ultrasonic agitation over several hours.

V. The resulting material was filtered and then rinsed with water.

VI. The rinsed material was dried overnight at ~80° C.

7. 20 wt % Co-TMPP on Carbon

I. 300 cc of $NH_4OH$ (ammonia) was added to 20 g of carbon under ultrasonic agitation.

II. 5 g of Co-TMPP was combined with 300 cc of acetone.

III. II was added to I under ultrasonic agitation over several hours.

IV. The resulting material was filtered and dried.

8. 15 wt % CoOx+5 wt % MnOx Loaded on Carbon

I. 400 cc of $NH_4OH$ (ammonia) was added to 30 g of carbon under ultrasonic agitation II. 3.56 g $MnSO_4 xH_2O$+17.39 g $CoSO_4$ were dissolved in 100 ml of water.

III. Once the carbon was completely wetted, II was added to I under ultrasonic agitation IV. Dilute NaOH solution was added to III under ultrasonic agitation over several hours.

V. The resulting material was filtered and then rinsed with water.

VI. The rinsed material was dried overnight at ~80° C.

9. 20 wt % Co-TMPP/15 wt % CoOx+5 wt % MnOx (□)

An electrode was prepared by blending 5.0 g of a 20 wt % Co-TMPP on carbon with 5.0 g 15 wt % CoOx+5 wt % MnOx on carbon.

The supported catalysts were formed into oxygen electrodes for use in a power generating alkaline fule cell and compared in sise-by-side tests, of Current Density ($mA/cm^2$) vs. Potential (V) against an oxygen electrode utilizing 10% and 20% by weight Co-TMPP catalyst, as shown in FIG. 9. As shown, the electrodes, even thought formed without noble metal or platinum catalysts, performed well.

While the invention has been illustrated in detail in the drawings and the foregoing description, the same is to be considered as illustrative and not restrictive in character, as it is appreciated that these catalysts may be used for in other applications, such as those described above. Further, it is understood that only the preferred embodiments have been shown and described in detail and that all changes and modifications that come within the spirit of the invention are desired to be protected.

What is claimed is:

1. A supported catalyst for an alkaline fuel cell comprising:
   a carrier matrix; and
   an active catalytic material supported by said carrier matrix, said active catalytic material including a mixed valence, nanoclustered metal oxide layer and an organometallic layer, said nanoclustered metal oxide layer and said organometallic layer being supported on said carrier matrix;
   said mixed-valence, nanoclustered metal oxide comprising cobalt-manganese oxides.

2. The supported catalyst according to claim 1, wherein said carrier matrix is carbon based.

3. The supported catalyst according to claim 1, wherein said mixed-valence, nanoclustered metal oxide is multicomponent and multifunctional with one component providing a rate of reaction favoring a first reaction step and another component providing a rate of reaction favoring a second reaction step over the first.

4. The supported catalyst according to claim 1, wherein said mixed-valence, nanoclustered metal oxide includes more metals in a lower oxidation state than metals in a higher oxidation state.

5. The supported catalyst according to claim 1, wherein said mixed valenced nanoclustered metal oxide includes three or more valences.

6. The supported catalyst according to claim 1, wherein said mixed valenced nanoclustered metal oxide includes four or more valences.

7. The supported catalyst of claim 1, wherein said mixed valenced nanoclustered metal oxide includes a plurality of grains having different orientations.

8. The supported catalyst according to claim 7, wherein said grains each have a diameter of 100 A or less.

9. The supported catalyst according to claim 1, wherein said organometallic comprises a macrocycle including at least one transition metal.

* * * * *